April 2, 1968 J. S. REYNOLDS 3,376,517
AUTOMATIC FREQUENCY CONTROL USING VOLTAGE TRANSITIONS OF AN INPUT REFERENCE SIGNAL
Filed Dec. 19, 1966 3 Sheets-Sheet 1
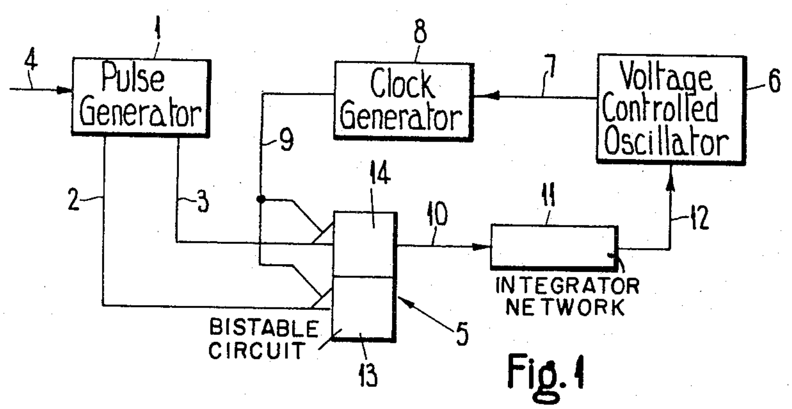
Fig. 1
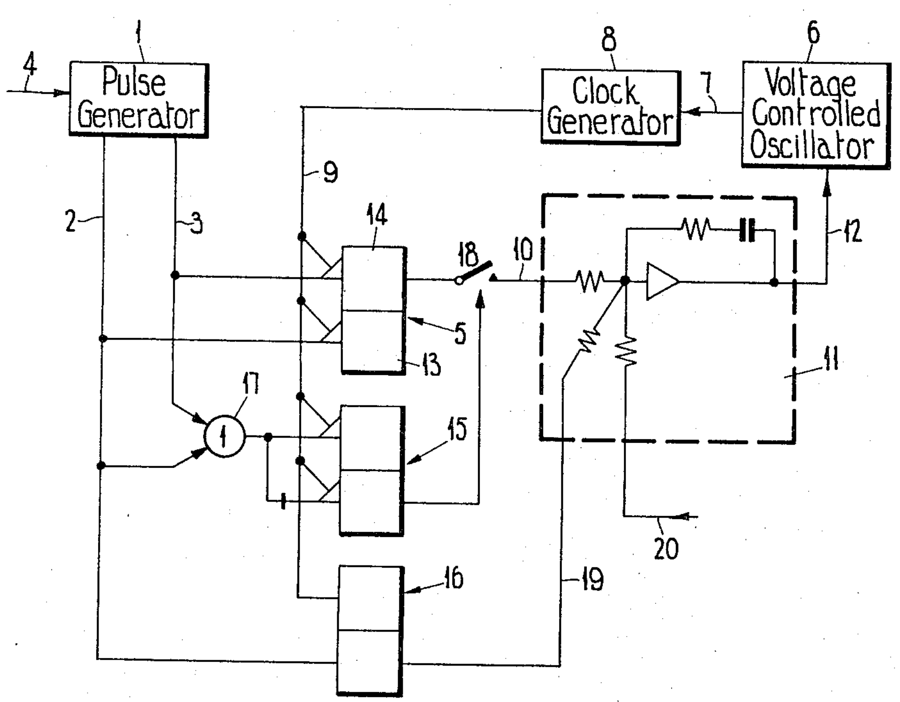
Fig. 2
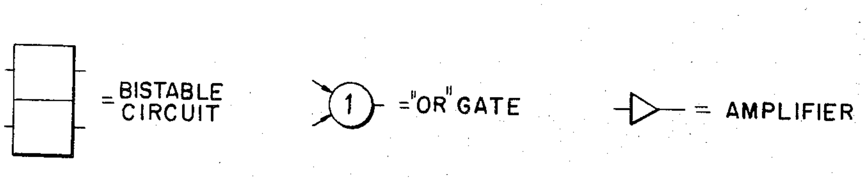

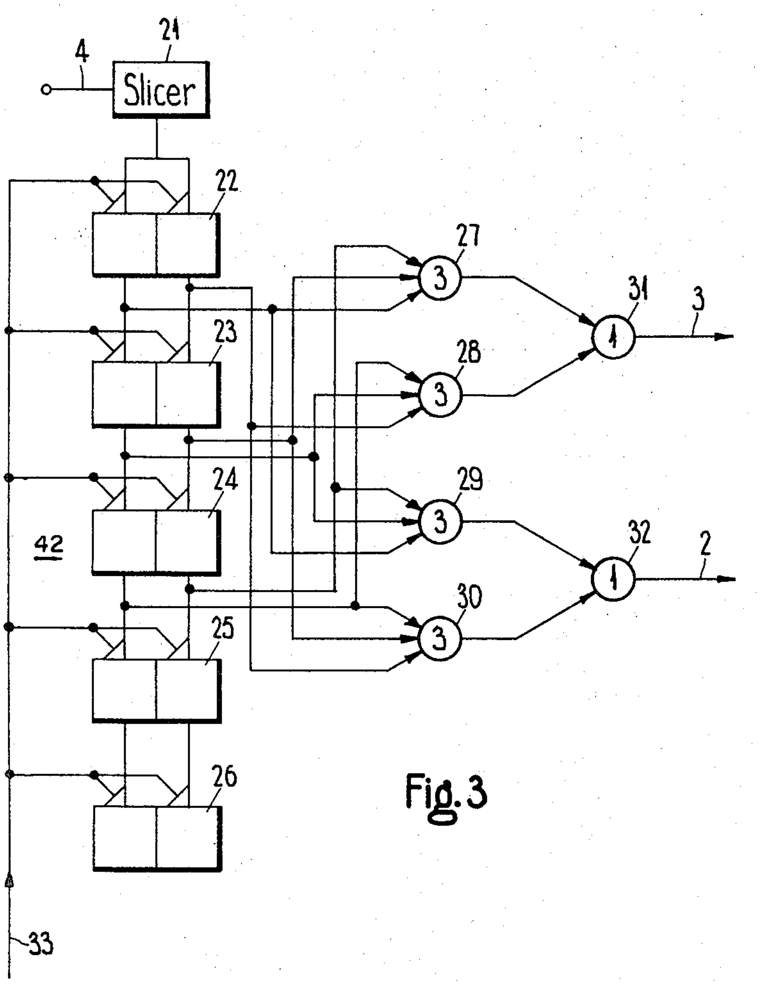
Fig. 3
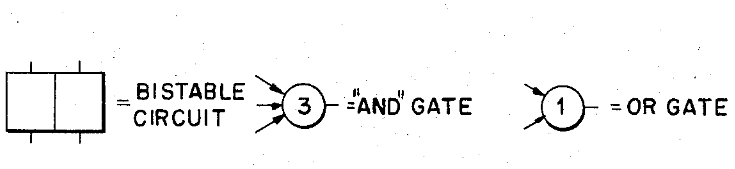

April 2, 1968 J. S. REYNOLDS 3,376,517

AUTOMATIC FREQUENCY CONTROL USING VOLTAGE TRANSITIONS OF AN INPUT REFERENCE SIGNAL

Filed Dec. 19, 1966 3 Sheets-Sheet 3

United States Patent Office 3,376,517

Patented Apr. 2, 1968

3,376,517
AUTOMATIC FREQUENCY CONTROL USING VOLTAGE TRANSITIONS OF AN INPUT REFERENCE SIGNAL

John Spackman Reynolds, Portchester, Fareham, England, assignor to The General Electric Company Limited, London, England, a British company Filed Dec. 19, 1966, Ser. No. 603,045
Claims priority, application Great Britain, Dec. 21, 1965, 54,188/65
5 Claims. (Cl. 331—18)

ABSTRACT OF THE DISCLOSURE

An arrangement for controlling the frequency of an oscillator in dependence upon an input signal, in which pulses derived from the output of the oscillator are applied, together with pulses derived in response to transitions between voltage levels in the input signal, to inputs of a bistable circuit so that the bistable circuit is switched between its two states in dependence upon the relative timing of pulses in the two sets. An output signal from the bistable circuit is integrated and utilized to control the frequency of the oscillator.

This invention relates to electric oscillation generators.

In signal transmission systems in which digital information is conveyed in the form of a signal which may have either of two voltage levels during each of a succession of equal time intervals, the waveform of the transmitted signal may be seriously distorted during transmission so that, as received, the transitions between the two voltage levels are not clearly defined. It is often necessary to lock the frequency of an oscillator at a receiving station of the system to the repetition frequency of said intervals of the received signal. This may be done by controlling the frequency of the oscillator in dependence upon the timing information that is embodied in the received signal in the form of transitions between the two voltage levels, but such an arrangement cannot be used if the transitions are not clearly defined.

One object of the present invention is to provide an oscillation generator the frequency of which may be controlled in dependence upon poorly defined transitions between two voltage levels of a received signal.

According to the present invention an electric oscillation generator having provision for controlling the frequency thereof comprises means responsive to each change in the instantaneous voltage level of an input signal applied thereto in at least one direction through a predetermined value to derive two non-coincident pulses one on each of two paths respectively, an electric oscillator means to derive a train of timing pulses from the output of said oscillator, a bistable circuit, means to trigger said bistable circuit to one of its stable states upon the occurrence of a timing pulse simultaneously with a pulse on one of the two paths and means to trigger said bistable circuit to its other stable state upon the occurrence of a timing pulse simultaneously with a pulse on the other path, and means to derive from an output of the bistable circuit a control signal that is utilized to control the frequency of said oscillator, at least under some operating conditions, such that said changes in the instantaneous voltage level of the input signal have approximately a predetermined time relationship to the timing pulses.

An electric oscillation generator having provision for controlling the frequency thereof, the generator being in accordance with the present invention, will now be described with reference to the accompanying drawings, of which:

FIGURE 1 shows the oscillation generator schematically,

FIGURE 2 shows an alternative form of the generator shown in FIGURE 1,

FIGURE 3 shows in detail one form of a part of the generator shown in FIGURE 1.

Figure 4:
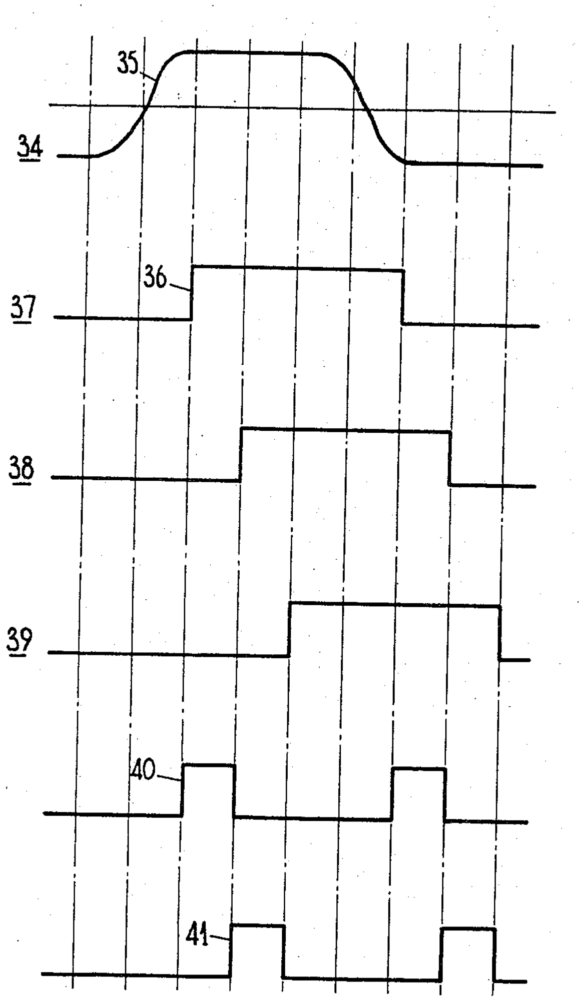
FIGURE 4 shows voltage waveforms used to illustrate the operation of part of the generator.

Referring to FIGURE 1 the oscillation generator comprises a pulse generator 1 which is arranged to supply a rectangular pulse waveform by way of each of the lines 2 and 3 for each cycle of an input signal which, for the purpose of the present description, will be assumed to have a repetitive waveform, for example a square wave, and which is supplied to the generator 1 by way of the line 4. The lines 2 and 3 are connected respectively to the two enabling input terminals of a bistable circuit 5.

An output signal from a variable frequency oscillator 6 is supplied by way of a line 7 to a clock-pulse generator 8, which supplies operating pulses to the two halves of the bistable circuit 5 by way of a line 9. A line 10 connects one output of the bistable circuit 5 to an integrating network 11, which is arranged to supply a control voltage by way of a line 12 to control the frequency of the oscillator 6.

The pulses supplied by the pulse generator 1 on the lines 2 and 3 coincide respectively in timing and duration with successive half-cycles of the input signal which is supplied by way of the line 4, so that enabling pulses are applied alternately to the two halves of the bistable circuit 5. It is arranged that when the oscillator 6 is oscillating at substantially the desired frequency a clock-pulse is supplied by way of the line 9 during each cycle of the input signal on the line 4. If this clock-pulse occurs during the first half-cycle of the input signal, that is while an enabling pulse is present on the line 2, the corresponding half 13 of the bistable circuit 5 is switched to or remains in the "on" state while the other half 14 of the bistable 5 is switched to or remains in the "off" state.

A signal representative of the "off" state is therefore supplied to the network 11, and it is arranged that the control voltage supplied by the network 11 to the oscillator 6 in response to such a signal from the bistable circuit 5 tends to reduce the frequency of the oscillator 6, so that successive clock-pulses occur later and later in successive first half-cycles of the input signal. Eventually the clock pulses commence to occur during the second half-cycles of the input waveform, that is while an enabling pulse is present on the line 3, whereupon the bistable circuit 5 is switched by a clock-pulse so that the half 14 is now in the "on" state and the half 13 is in the "off" state. In response to the signal representing the "on" state of the half 13 which is now supplied to the network 11 the frequency of the oscillator 6 is increased, so that the "drift" in the timing of the clock-pulse from the first half-cycle into the second half-cycle of the input signal is reversed. In normal operation therefore the timing of the clock-pulses will vary about a mean point in the cycle of the input signal represented by the termination of the enabling pulse on the line 2 and the commencement of the enabling pulse on the line 3.

If the frequency of the oscillator 6 differs greatly from the frequency of the input signal the bistable circuit 5 is switched frequently between its two states as successive clock-pulses drift in timing with respect to the cycles of the input signal, and the value of the signal supplied to the integrating network 11 tends to be the mean value of the signals representing the "on" and "off" states of the bistable circuit 5, whatever the sense of the frequency difference. In other words although the circuit arrangement described above is phase-sensitive it is not frequency-sensitive.

In order to provide a measure of frequency-sensitivity the enabling pulses on the lines 2 and 3 are arranged to have durations each less than that of a half-cycle of the input signal, while still occurring consecutively and at fixed times in the cycle of the input signal, there being no enabling pulses present during the remainder of each cycle. Since the bistable circuit 5 remains in any given state until switched to its other state it will be appreciated that if the clock-pulses drift in timing with respect to the enabling pulses the sense of the drift will determine in which of its two states the bistable spends most of its time. Thus if the frequency of the oscillator 6 is lower than that of the input signal the clock-pulses drift first through the period of the earlier of the two enabling pulses, that is the pulse on the line 2, then through the period of the later of the two enabling pulses, that is the pulse on the line 3, and then through the remainder of the cyclic period of the input signal during which no enabling signal is present. The bistable circuit 5 therefore supplies to the network 11 a signal representing the "off" state while the clock-pulse drifts through the period of the earlier enabling pulse, and a signal representing the "on" state while the clock-pulse drifts through the period of the later enabling pulse and through the period during which neither enabling pulse is present. If for example the enabling pulses are each of the duration of a quarter of a cycle of the input signal, the bistable circuit 5 supplies to the network 11, on average, an "off" signal for twenty-five percent of the time and an "on" signal for seventy-five percent of the time, this inequality being in the right sense to bring about an increase in the frequency of the oscillator 6.

If, on the other hand, the frequency of the oscillator 6 is higher than that of the input signal the clock pulses will drift in timing in the opposite sense to that described in the preceding paragraph, and the bistable circuit 5 will supply to the network 11 an "off" signal for seventy-five percent of the time and an "on" signal for twenty-five percent of the time, this inequality being in the right sense to bring about a decrease in the frequency of the oscillator 6. Once the frequency of the oscillator 6 has been altered by the control voltage such that the clock-pulses drift in timing only within the range defined by the enabling pulses the arrangement operates as first described above.

Referring now to FIGURE 2, the frequency-sensing and phase-sensing functions of the arrangement described above in relation to FIGURE 1 are separated by providing two further bistable circuits 15 and 16, the bistable circuit 15 receiving enabling signals from the lines 2 and 3 by way of an "or" gate 17, and the bistable circuit 16 being switched to one state by the occurrence of an enabling pulse on the line 2 and to the other state by the occurrence of a clock pulse on the line 9. A switch 18 in the line 10 is arranged to operate in dependence upon the state of the bistable circuit 15. The bistable circuit 16 is arranged to provide a two-level signal to the network 11 by way of a line 19.

The arrangement of the "or" gate 17 and the bistable circuit 15 is such that the switch 18 is operated only when a clock-pulse occurs on the line 9 in the absence of an enabling signal on either of the lines 2 or 3. Thus if there is an appreciable difference between the frequency of the oscillator 6 and that of the input signal, so that the bistable circuit 5 spends more of its time in one state than the other according to the sense of the frequency difference, as described above in relation to FIGURE 1, there will be applied to the network 11, by way of the switch 18, a signal representing only the state in which the bistable circuit 5 is left during periods when clock-pulses do not coincide with enabling pulses on the lines 2 or 3. This signal, as in the case of the arrangement of FIGURE 1, is arranged to be of the correct sense to reduce the frequency difference.

The bistable circuit 16 is switched, as described above, by pulses on the line 2 and on the line 9, so that the mean value of the signal supplied by the bistable circuit 16 to the network 11 is dependent upon the time interval between these pulses. If the frequency of the oscillator 6 and that of the input signal differ the time interval between pulses on the line 2 and on the line 9 varies continually, and the signal supplied by the bistable circuit 16 to the network 11 has a mean value equivalent to an on/off ratio of one, this mean value being virtually independent of the magnitude of the frequency difference.

The action of the bistable circuits 5 and 15 tends to reduce the difference between the frequency of the oscillator 6 and that of the input signal so that the interval between pulses on the line 2 and on the line 9 varies more slowly. The output voltage of the integrating network 11, that is the control voltage for the generator 6, therefore begins to follow the variations in the mean level of the output signal of the bistable circuit 16 until eventually the variation is sufficient to bring the oscillator 6 into synchronism with the input signal. Thereafter the output signal of the oscillator 6 is maintained in a substantially constant phase relationship with respect to the input signal, in contrast with the phase relationship of the arrangement shown in FIGURE 1 which alternates about a mean value.

A unidirectional voltage may be applied by way of a lead 20 to another input of the network 11, in addition to the signals from the bistable circuits 5 and 16, to set the phase difference between the input signal and the output signal of the oscillator 6.

The circuit arrangement described above in relation to FIGURE 1, which is intended for use with regularly recurrent input signals such as alternating current signals, may be adapted for use with two-level input signals representing, for example, a stream of binary digits by utilising a pulse generator 1 of the form shown in FIGURE 3. During any digit period of such a stream the input signal level may represent either a one or a zero, and since several digits in succession may have the same value timing information, in the form of a transition between levels in the input signal, is not constantly available in or readily derived from the input signal.

As shown in FIGURE 3 the form of pulse generator 1 for use with random two level signals comprises a slicer or amplitude gate 21 and a shift register 42 having five stages 22 to 26, the slicer 21 passing to the stage 22 those portons of the input signal on the line 4 that lie between predetermined voltage limits. Each of two outputs of the three stages 22, 23 and 24 is connected to an input of two out of four "and" gates 27 to 30. The outputs of the gates 27 and 28 are connected to the inputs of an "or" gate 31 whose output is connected to the line 3, and the outputs of the gates 29 and 30 are connected to the inputs of an "or" gate 32 whose output is connected to the line 2.

The oscillator 6 of FIGURE 1 is arranged to oscillate at a frequency of approximately four times the digit rate of the input signal and the clock-pulse generator 8 is arranged to provide a clock-pulse once every four cycles of the signal from the oscillator 6 so that the clock-pulses recur at the same rate as the digits of the input signal.

Referring also to FIGURE 4, the states of the stages 22 to 26 of the shift register 42 are arranged to be stepped by pulses on a line 33 at a "sampling" frequency equal to the frequency of the oscillator 6, so that approximately four times during each digit period of the input signal 34 the state of the binary stage 22 is set to represent the level of the input signal 34.

When a transition 35 occurs in the input signal 34 between the level representing one digit value and the level representing the other digit value a corresponding change 36 is produced in the state of the stage 22 represented at 37 in FIGURE 4, and this change of state 36 is stepped through the succeeding stages 23 to 26 at the sampling rate.

The connections to the "and" gates 27 to 30 are such that when a change of state 36 in one sense or the other has occurred in the stage 22 but not in the stages 23 or 24 whose states are represented at 38 and 39 respectively, one or other of the gates 27 and 28 produces an output pulse, in dependence upon the sense of the change, so that a pulse 40 appears on the line 3. This pulse has a duration approximately equal to the sampling period, that is, one quarter of the clock-pulse repetition period.

When the change of state 36 has been stepped one stage further, so that the stages 22 and 23 are in the same state but the stage 24 is in the opposite state, one or other of the gates 29 and 30 produces an ouput pulse, in dependence upon the sense of the change, so that a pulse 41 appears on the line 2. This pulse also has a duration approximately equal to one quarter of the clock-pulse repetition period.

As in the case of the arrangement described in relation to FIGURE 1, if a clock-pulse occurs during the presence of a pulse 41 on the line 2 the frequency of the oscillator 6 is arranged to be reduced, while if a clock-pulse occurs during the presence of a pulse 40 on the line 3 the frequency of the oscillator 6 is increased, so that the clock-pulses are controlled to keep in step approximately with the digits of the input signal.

It will be appreciated that in the case of the arrangement described in relation to FIGURES 1 and 2 the timing of the pulses on the line 2 and on the line 3 is derived from the input signal so that the clock-pulses, which are derived from the output signal of the oscillator 6, can vary continuously in timing with respect to the occurrences of the pulses on the lines 2 and 3. In the arrangement described in relation to FIGURE 3 however, the timing of the sampling pulses, and therefore of the pulses 41 and 40 on the lines 2 and 3 respectively, and the timing of the clock-pulses are derived from the same source, namely the oscillator 6, so that if a clock-pulse occurs during the presence of an enabling pulse 41 and 40 on the respective one of the lines 2 and 3 the clock-pulse has a fixed time position with respect to the timing of the enabling pulse 41 or 40. It will further be appreciated that this difference is immaterial in an arrangement of the form shown in FIGURE 1, although an arrangement of the form shown in FIGURE 2 is not adaptable in the manner described in relation to FIGURE 3.

Referring again to FIGURE 3, when a change of state 36 has occurred in the stage 22 but not in any of the stages 23 to 26 these stages 23 to 26 will all be in a state representing the value of the previous digit. Similarly when stages 22 and 23 have changed their state but stages 24 to 26 have not the state of these stages 24 to 26 again represents the value of the preceding digit. Since in normal operation a clock-pulse occurs during the existence of one or other of the above conditions, the value of each digit in turn can be derived from the state of, say, the stage 25 when a clock-pulse occurs.

I claim:

1. An electric oscillation generator having provision for controlling the frequency thereof comprising means responsive to each change in the instantaneous voltage level of an input signal applied thereto in at least one direction through a predetermined value to derive two non-coincident pulses one on each of two paths respectively, an electric oscillator, means to derive a train of timing pulses from the output of said oscillator, a bistable circuit, means to trigger said bistable circuit to one of its stable states upon the occurrence of a timing pulse simultaneously with a pulse on one of the two paths and means to trigger said bistable circuit to its other stable state upon the occurrence of a timing pulse simultaneously with a pulse on the other path, and means to derive from an output of the bistable circuit a control signal that is utilized to control the frequency of said oscillator, at least under some operating conditions, such that said changes in the instantaneous voltage level of the input signal have approximately a predetermined time relationship to the timing pulses.

2. An electric oscillation generator in accordance with claim 1 comprising a second bistable circuit that is responsive to the occurrence of a timing pulse at the same time as a pulse on either of said paths to disconnect the output of the first-mentioned bistable circuit from said means to derive a control signal, and a third bistable that is arranged to be switched to one of its stable states by a timing pulse and to the other of its stable states by a pulse on one of said two paths, an output from said third bistable being passed to said means to derive a control signal.

3. An electric oscillation generator in accordance with claim 1 wherein said means to derive two non-coincident pulses comprises a shift register, means to step said shift register at a multiple of the timing pulse rate, means including a slicer to apply said input signal to the input of said shift register, and gating means which is connected to a plurality of stages of the shift register and which is responsive to a change of state being stepped through said stages of the shift register to provide said two non-coincident pulses.

4. An electric oscillator in accordance with claim 1 wherein said timing pulses are derived by frequency division from the output of said oscillator.

5. An electric oscillator generator in accordance with claim 1 in which the means to derive a control signal includes an integrator circuit.

References Cited

UNITED STATES PATENTS

| | | | |
|---|---|---|---|
| 3,156,874 | 11/1964 | Verdibello | 331—27 |
| 3,290,611 | 12/1966 | Horlacher et al. | 331—18 X |

ROY LAKE, *Primary Examiner.*

S. H. GRIMM, *Assistant Examiner.*